United States Patent
Pollock et al.

(10) Patent No.: US 9,910,579 B2
(45) Date of Patent: Mar. 6, 2018

(54) DETECTION OF PAN AND SCALING DURING MULTI-FINGER TOUCH INTERACTIONS

(71) Applicant: Microsoft Technology Licensing, LLC, Redmond, WA (US)

(72) Inventors: Nathan Pollock, Seattle, WA (US); Lauren Gust, Bellevue, WA (US); Uros Batricevic, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 761 days.

(21) Appl. No.: 13/862,489

(22) Filed: Apr. 15, 2013

(65) Prior Publication Data

US 2014/0310625 A1 Oct. 16, 2014

(51) Int. Cl.
*G06F 3/0485* (2013.01)
*G06F 3/0488* (2013.01)

(52) U.S. Cl.
CPC .......... *G06F 3/0485* (2013.01); *G06F 3/0488* (2013.01)

(58) Field of Classification Search
CPC ...... G06F 3/017; G06F 3/0425; G06F 3/0428; G06F 3/0488; G06F 2203/04808
USPC ................................ 715/700–866
See application file for complete search history.

(56) References Cited

U.S. PATENT DOCUMENTS

| | | | |
|---|---|---|---|
| 7,075,513 B2 | 7/2006 | Silfverberg et al. | |
| 7,814,439 B2 | 10/2010 | Fitzmaurice et al. | |
| 8,059,101 B2 | 11/2011 | Westerman et al. | |
| 8,176,438 B2 | 5/2012 | Zaman et al. | |
| 8,291,341 B2 | 10/2012 | Tseng et al. | |
| 8,314,775 B2 | 11/2012 | Westerman et al. | |
| 9,235,338 B1* | 1/2016 | Barr | G06F 3/04883 |
| 2006/0274046 A1* | 12/2006 | Hillis | G06F 3/04883 345/173 |
| 2007/0283263 A1* | 12/2007 | Zawde | G06F 3/03547 715/700 |

(Continued)

FOREIGN PATENT DOCUMENTS

| | | |
|---|---|---|
| CN | 102341814 A | 2/2012 |
| JP | 2008070968 A | 3/2008 |

(Continued)

OTHER PUBLICATIONS

"International Search Report & Written Opinion for PCT Patent Application No. PCT/US2013/058665", dated Dec. 3, 2013, Filed Date: Sep. 9, 2013, 10 pages.

(Continued)

*Primary Examiner* — Abdullah Al Kawsar
*Assistant Examiner* — Daniel Samwel
(74) *Attorney, Agent, or Firm* — Arent Fox LLP

(57) ABSTRACT

In one embodiment, a graphical display device may use a set of one or more thresholds to remove a scaling motion from a panning input using multiple fingers. The graphical display device may receive a user input in a user movement interface having at least a first bio-point 210 and a second bio-point 210. The graphical display device may detect a panning motion from the user input. The graphical display device may filter out a scaling motion from the user input based on a scaling threshold. The graphical display device may present a pan of a graphical user interface to a user.

19 Claims, 7 Drawing Sheets

(56) References Cited

U.S. PATENT DOCUMENTS

| | | | | |
|---|---|---|---|---|
| 2009/0146951 A1* | 6/2009 | Welland | ............... | G06F 3/017 345/158 |
| 2009/0292989 A1* | 11/2009 | Matthews | ........... | G06F 3/04883 715/702 |
| 2010/0283739 A1* | 11/2010 | Zhang | ............... | G06F 3/04883 345/173 |
| 2011/0093820 A1* | 4/2011 | Zhang | .................. | A63F 13/06 715/863 |
| 2012/0013529 A1 | 1/2012 | McGibney et al. | | |
| 2014/0019917 A1* | 1/2014 | Piemonte | ............... | G06F 3/017 715/848 |
| 2014/0062914 A1* | 3/2014 | Lin | .................. | G06F 3/0485 345/173 |

FOREIGN PATENT DOCUMENTS

| | | |
|---|---|---|
| JP | 2013257775 A | 12/2013 |
| TW | 201222344 A | 6/2012 |

OTHER PUBLICATIONS

Wijk, et al., "Smooth and Efficient Zooming and Panning", Retrieved at <<http://www.cs.ubc.ca/~tmm/courses/cpsc533c-04-spr/readings/zoompan.pdf>>, In Proceedings of the Ninth annual IEEE Conference on Information Visualization, Oct. 21, 2003, pp. 8.

Malacria, et al., "Clutch-Free Panning and Integrated Pan-Zoom Control on Touch-Sensitive Surfaces: The CycloStar Approach", Retrieved at <<http://dmrussell.net/CHI2010/docs/p2615.pdf>>, In Proceedings of the SIGCHI Conference on Human Factors in Computing Systems, Apr. 10. 2010, pp. 10.

"Office Action Issued in Japanese Patent Application No. 2016-507529", dated May 18, 2017, 10 Pages.

"Office Action Issued in Taiwan Patent Application No. 102132827", dated Mar. 31, 2017, 7 Pages.

"Office Action and Search Report Issued in Taiwan Patent Application No. 102132827", dated Nov. 16, 2016, 9 Pages.

"Office Action Issued in Chinese Patent Application No. 201380075632.8", dated Nov. 3, 2017, 8 Pages.

\* cited by examiner

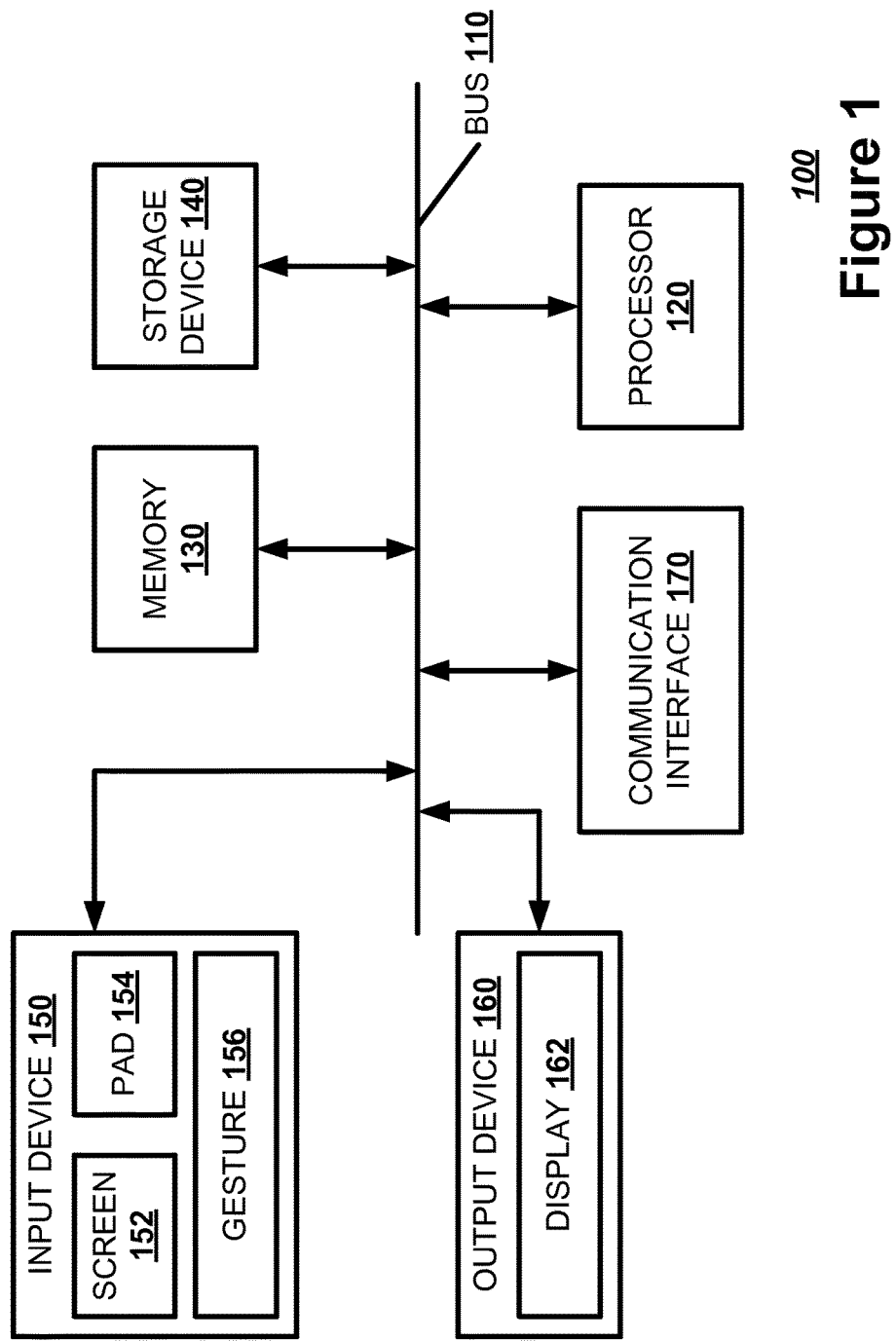

DETECTION OF PAN AND SCALING DURING MULTI-FINGER TOUCH INTERACTIONS

BACKGROUND

The input mechanisms for computing devices have increased in complexity of interactions offered and ease of use. A touch screen may allow a user to easily pan and scale in a graphical user interface using just a single finger. For example, a user may place a finger on the touch screen and drag the finger across the screen, indicating a pan. Additionally, a user may double tap the screen to indicate that scaling in on an image is desired.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using a set of one or more thresholds to remove a scaling motion from a panning input using multiple fingers. The graphical display device may receive a user input in a user movement interface having at least a first bio-point and a second bio-point. The graphical display device may detect a panning motion from the user input. The graphical display device may filter out a scaling motion from the user input based on a scaling threshold. The graphical display device may present a pan of a graphical user interface to a user.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates, in a block diagram, one embodiment of a computing device.

FIGS. 2a-b illustrate, in block diagrams, one embodiment of a multi-finger interaction with a user interface.

DETAILED DESCRIPTION

Figure 2B:
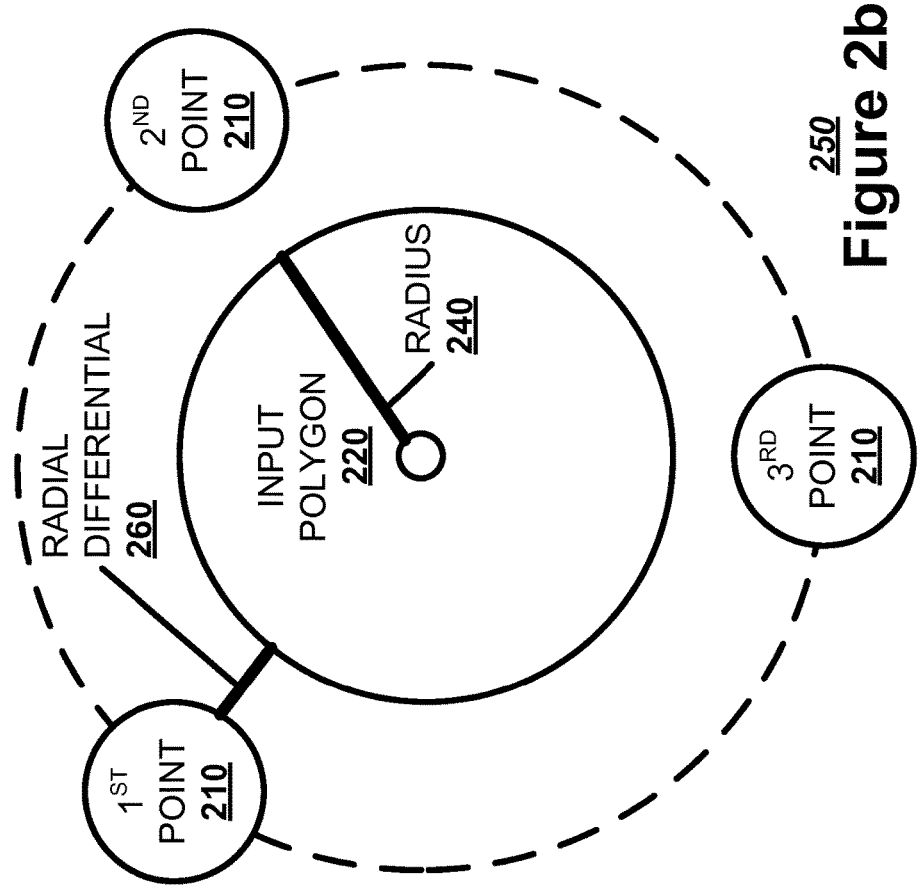

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a graphical display device.

A user may sometimes pan a graphical user interface on a touch screen. A pan is a linear motion of the visual frame of the graphical user interface to view content that exceeds the visual frame. The visual frame is the portion of the graphical user interface visible to the user on the touch screen. The user may slide one or more fingers across the touch screen to indicate a pan motion input.

A user may sometimes scale in or out on a graphical user interface on a touch screen. A scale is an expansion or a contraction of the visual frame of the graphical user interface to view content that exceeds the visual frame or to get a closer look at the content. The user may move fingers apart on the touch screen or bring the fingers together to indicate a scale motion input.

If the user is using multiple fingers to indicate a pan motion on a touch screen, the user may accidentally indicate a scale motion. A graphical display device may filter out the scale motion from the user input if the scale motion does not reach a scaling threshold, such as a differential threshold or a ratio threshold.

A graphical display device may calculate a radial differential representing the changing distance between the one or more fingers. For any manipulation, the graphical display device may calculate an input shape representing the contacts on the screen. The radial differential is the change in the input radius of the input shape since the first manipulator event. When performing a pan with multiple fingers, a user may invariably cause minor changes in the distance between the contacts, resulting in the input shape expanding or contracting. These changes may result in small changes in the radial differential value, but when the radial differential is below a differential threshold, the graphical display device may hold the scaling constant. When the number of contacts is changed, the graphical display device may reset the initial input shape to the new input shape.

Alternately, the graphical display device may calculate a radial velocity compared to a panning velocity. The radial velocity is the velocity at which the input radius is changing. The x-velocity and y-velocity are the velocities at which the center point of the input shape is moving in the horizontal and vertical directions. The graphical display device may combine these values to calculate a linear center point velocity in two-dimensional space. The graphical display device may apply exponential smoothing to the ratio of radial velocity to panning velocity. If this smoothed expansion ratio is less than a ratio threshold, then the graphical display device may hold the scaling constant.

For example, $$(\text{linear velocity})^2 = (x \text{ velocity})^2 + (y \text{ velocity})^2$$

$$\text{velocity ratio at time } t \stackrel{def}{=} N(t) = \frac{(\text{differential velocity})^2}{(\text{linear velocity})^2}$$

$$\overline{N}(t) = \alpha N(t) + (1 - \alpha)\overline{N}(t-1); \text{ where } \alpha \text{ defines a smoothing factor.}$$

$$|\overline{N}(t)| < \text{threshold} \rightarrow \text{scaling locked}$$

If the linear velocity is zero, then |N̄(t)| may be considered to be greater than the ratio threshold and scaling may be enabled. In this case, the graphical display device may set N(t) to a very large number (>largest natural number N(t)), so that the decay may continue to be calculated.

The graphical display device may implement the differential threshold comparison and the ratio threshold comparison with OR logic. If either threshold is not met, the graphical display device may filter out the scaling motion.

Thus, in one embodiment, a graphical display device may use a set of one or more thresholds to remove a scaling motion from a panning input using multiple fingers. The graphical display device may receive a user input in a user movement interface having at least a first bio-point and a second bio-point. The graphical display device may detect a panning motion from the user input. The graphical display device may filter out a scaling motion from the user input based on a scaling threshold. The graphical display device may present a pan of a graphical user interface to a user.

FIG. 1 illustrates a block diagram of an exemplary computing device 100 which may act as a graphical display device. The computing device 100 may combine one or more of hardware, software, firmware, and system-on-a-chip technology to implement graphical display device. The computing device 100 may include a bus 110, a processor 120, a memory 130, a data storage 140, an input device 150, an output device 160, and a communication interface 170. The bus 110, or other component interconnection, may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface.

The input device 150 may include one or more conventional mechanisms that permit a user to input information to the computing device 100, such as a keyboard, a mouse, a voice recognition device, a microphone, a headset, a touch screen 152, a track pad 154, a gesture recognition device 156, etc. The output device 160 may include one or more conventional mechanisms that output information to the user, including a display 162, a printer, one or more speakers, a headset, or a medium, such as a memory, or a magnetic or optical disk and a corresponding disk drive. A touch screen 152 may also act as a display 162, while a track pad 154 merely receives input. The communication interface 170 may include any transceiver-like mechanism that enables computing device 100 to communicate with other devices or networks. The communication interface 170 may include a network interface or a transceiver interface. The communication interface 170 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 170.

Figure 2A:
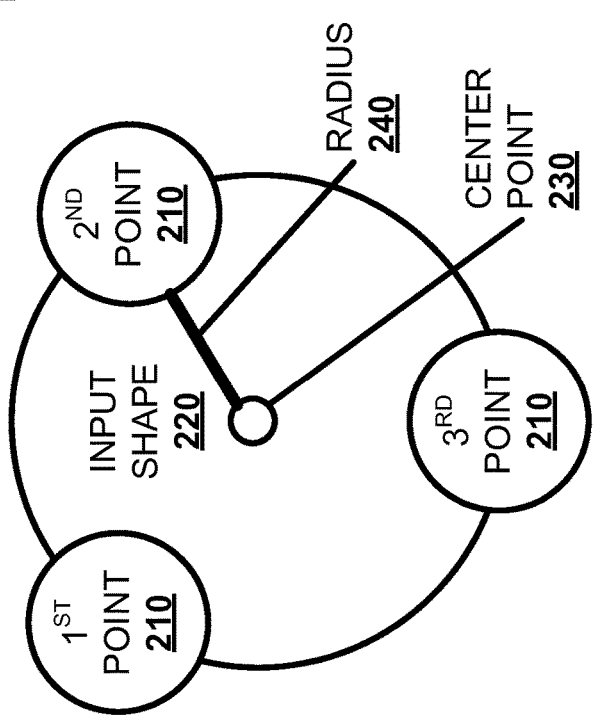

FIG. 2a illustrates, in a block diagram, one embodiment of a predecessor multi-finger interaction 200 with a user interface. A user may place one or more digits on a touch screen 152 or track pad 154. Each of these digits may act as a bio-point 210. A bio-point 210 is a point of reference physically connected to the user that a user movement interface may detect to receive a user input. A gesture capture device 156 may also use one or more bio-points 210 to determine a user input, such as a user's hands, arms, legs, face, or prosthetics.

A user movement interface, such as a touch screen 152, a track pad 154, or a gesture capture device 156, may use multiple bio-points 210 to create an input shape 220 representing the user input, such as a circle or a polygon. For example, a user may place two fingers on the user movement interface, creating a first bio-point 210 and a second bio-point 210. The user movement interface may create an input shape 220 of a circle, so that the first bio-point 210 and the second bio-point create a diameter that bisects the circle through a center point 230 of the circle.

In another example, a user may place three fingers on a user movement interface. These three digits may create a first bio-point 210, a second bio-point 210, and a third bio-point 210. The user movement interface may create an input shape 220 of a circle or other form of ellipse, with the three bio-points 210 each residing on the perimeter of the circle. Alternately, the user movement interface may create an input shape 220 of a triangle, with the three bio-points 210 residing at the corners of the triangle. The user movement interface may use additional bio-points 210 to create other input shapes 220, such as a quadrilateral with four bio-points 210 or a pentagon with five bio-points 210.

The user movement interface may determine a center point 230 of the input shape 220. The center point 230 may be relatively equidistant from each of the bio-points 210. The user movement interface may track the center point 230 to detect a panning motion based on a center point 230 movement. The speed of the center point 230 movement may also be tracked to calculate a center point velocity. The user movement interface may calculate the input radius 240 of the input shape 220, representing the distance between the center point 230 and a bio-point 210.

FIG. 2b illustrates, in a block diagram, one embodiment of a successor multi-finger interaction 250 with a user interface. The user may move one or more of the fingers, causing the input radius 240 to expand or contract. This change in the input radius 240 may be referred to as a radial differential 260. The radial differential 260 may be used to determine whether to scale in or scale out on a graphical user interface. The user movement interface may also track a radial velocity for the input shape 220, to determine the speed at which the input radius 240 is expanding or contracting. The radial velocity may be divided by the center point velocity, or panning velocity, to determine the velocity ratio.

Figure 3:
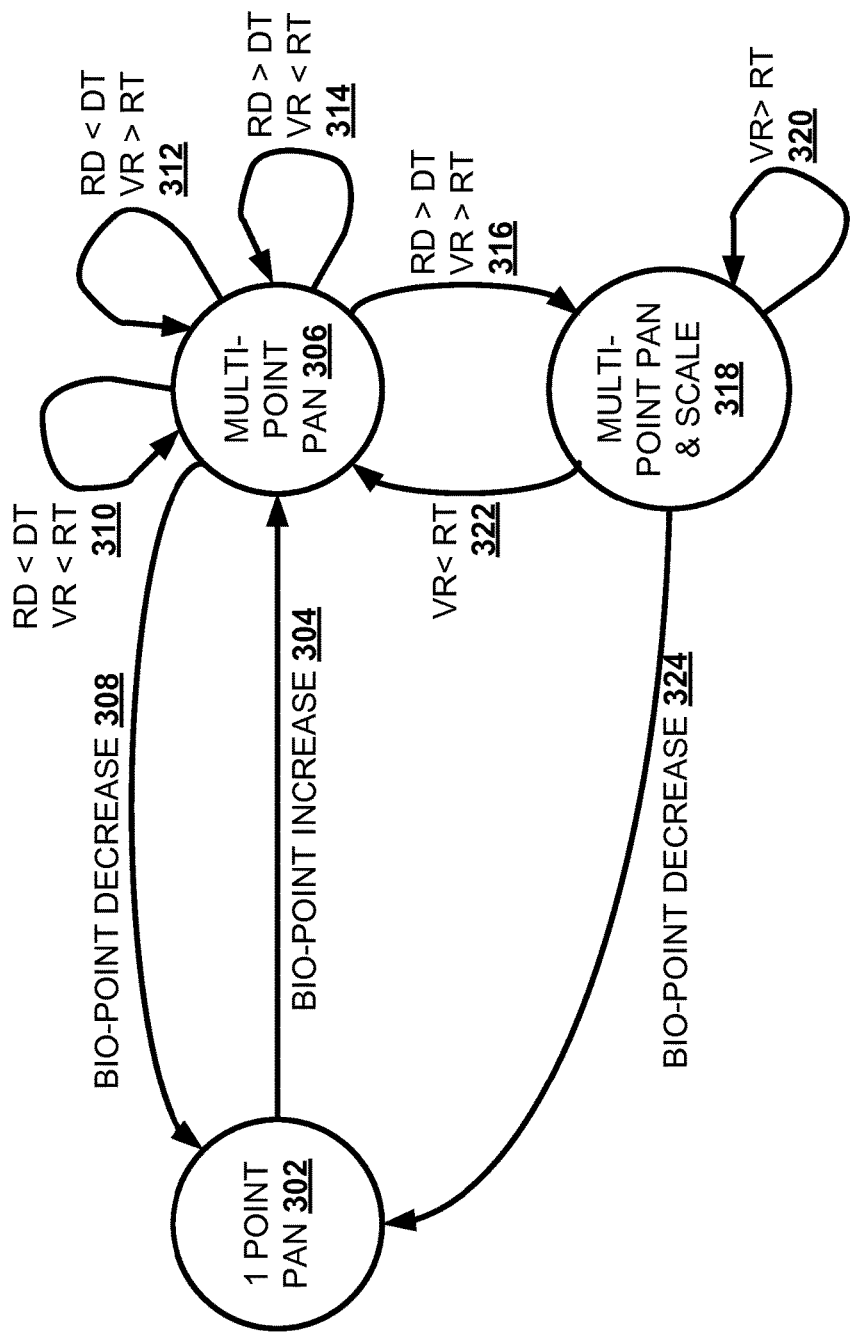
FIG. 3 illustrates, in a block diagram, one embodiment of a state machine representing multi-finger user input interactions.

FIG. 3 illustrates, in a block diagram, one embodiment of a state machine 300 representing multi-finger user input interactions. If a user is using a single bio-point 210, such as a finger, the user movement interface may be in a single bio-point pan state 302. If the user adds bio-points 210 in a bio-point increase 304, the user movement interface may change to a multi-point pan state 306. From the multi-point pan state 306, if the user decreases bio-points 210 in a bio-point decrease 308, the user movement interface may change back to a single point pan state 302.

From the multi-point pan state 306, if the radial differential is less than a differential threshold (RD<DT) and the velocity ratio is less than a ratio threshold (VR<RT) 310, the user movement interface may stay in the multi-point pan state 306. From the multi-point pan state 306, if the radial differential is less than a differential threshold (RD<DT) but the velocity ratio is greater than a ratio threshold (VR>RT) 312, the user movement interface may stay in the multi-point pan state 306. From the multi-point pan state 306, if the radial differential is greater than a differential threshold (RD>DT) but the velocity ratio is less than a ratio threshold (VR<RT) 314, the user movement interface may stay in the multi-point pan state 306. From the multi-point pan state 306, if both the radial differential is greater than a differential threshold (RD>DT) and the velocity ratio is greater than a ratio threshold (VR>RT) 316, the user movement interface may change into a multi-point pan and scale state 318.

From the multi-point pan and scale state 318, if the velocity ratio is greater than a ratio threshold (VR>RT) 320, the user movement interface may stay in the multi-point pan and scale state 318. From the multi-point pan and scale state 318, if the velocity ratio is less than a ratio threshold (VR<RT) 322, the user movement interface may return to the multi-point pan state 306. From the multi-point pan and scale state 318, if the user decreases bio-points 210 in a bio-point decrease 324, the user movement interface may return to a single point pan state 302.

Figure 4:
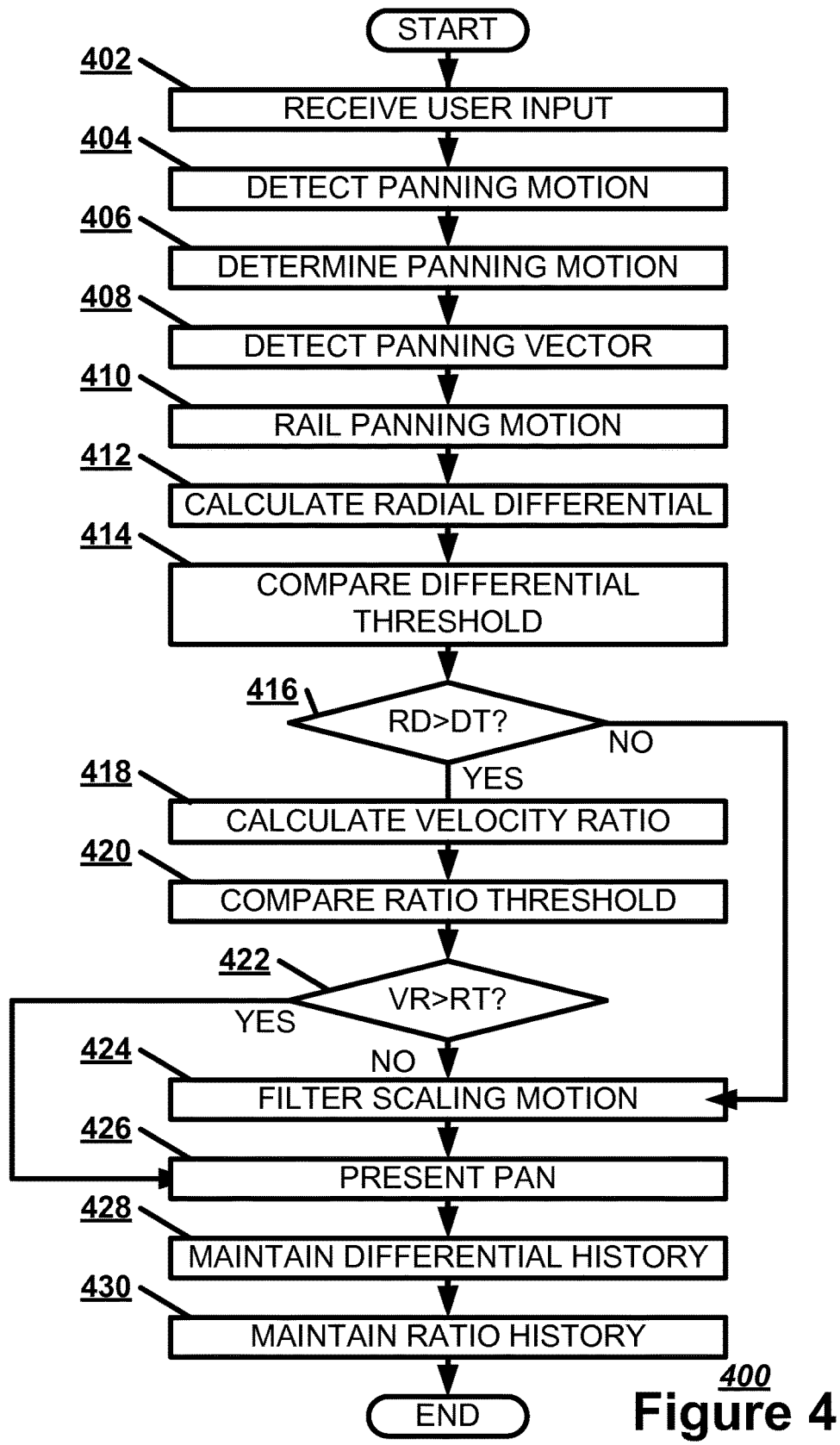
FIG. 4 illustrates, in a flowchart, one embodiment of a method of receiving a user input for a graphical user interface.

FIG. 4 illustrates, in a flowchart, one embodiment of a method 400 of receiving a user input for a user movement interface. A graphical display device may receive a user input in a user movement interface having at least a first bio-point 210 and a second bio-point 210 (Block 402). The graphical display device may detect a panning motion from the user input (Block 404). The graphical display device may determine a panning motion based on the user input (Block 406). The graphical display device may detect a panning vector from the panning motion (Block 408). The graphical display device may rail the panning motion along the panning vector (Block 410). Railing the panning motion locks the panning motion to move in the direction of the panning vector. The graphical display device may calculate a radial differential 360 for an input shape representing the user input (Block 412). The graphical display device may compare the radial differential 360 to a differential threshold (Block 414). If the radial differential 360 is greater than the differential threshold (Block 416), the graphical display device may calculate a velocity ratio based on a center point velocity and a radial velocity (Block 418). The graphical display device may compare the velocity ratio to a ratio threshold (Block 420). If the velocity ratio is less than the ratio threshold (Block 422), the graphical display device may filter out a scaling motion from the user input based on a scaling threshold (Block 424). The graphical display device may present a pan of a graphical user interface to a user (Block 426).

The graphical display device may maintain a differential history for optimizing the differential threshold (Block 428). The ratio history may track the radial differential and whether the radial differential exceeded the differential threshold. The graphical display device may maintain a ratio history for optimizing the ratio threshold (Block 430). The ratio history may track the velocity ratio and whether the velocity ratio exceeded the ratio threshold. The differential history and ratio history may track whether the user followed up the input by re-entering a definitive scaling motion, indicating that a scale was or was not intended initially. The graphical display device may use the differential history to adjust the differential threshold. The graphical display device may use the ratio history to adjust the ratio threshold.

Figure 5:
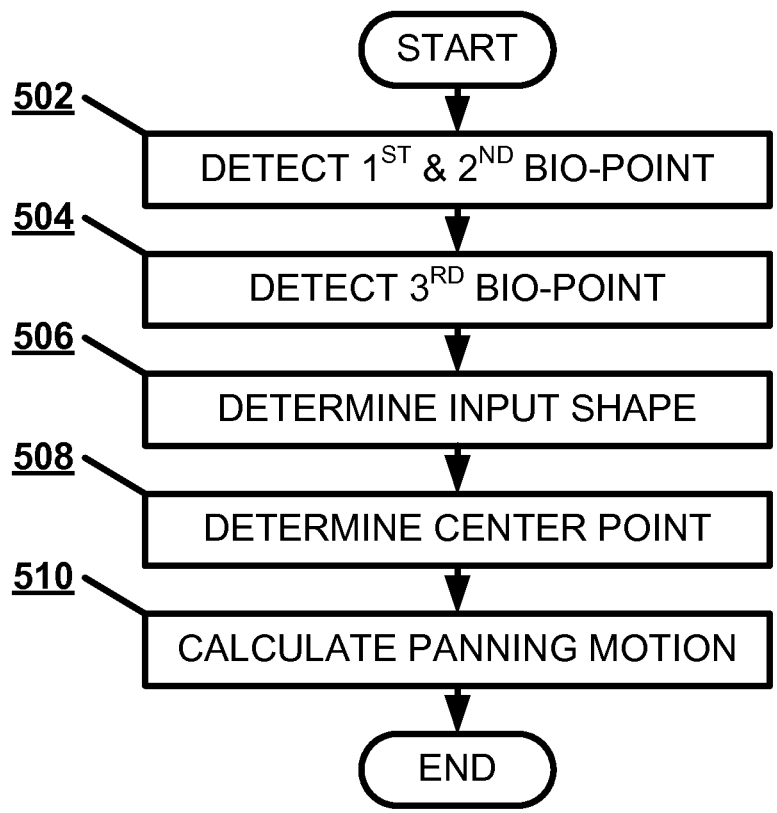
FIG. 5 illustrates, in a flowchart, one embodiment of a method of detecting a panning motion.

FIG. 5 illustrates, in a flowchart, one embodiment of a method 500 of detecting a panning motion. The graphical display device may detect a first bio-point 210 and a second bio-point 210 in the user input (Block 502). The graphical display device may detect a third bio-point 210 in the user input (Block 504). The graphical display device may determine an input shape 220 based on at least the first bio-point 210 and the second bio-point 210 (Block 506). The graphical display device may determine a center point 230 of the input shape 220 (Block 508). The graphical display device may calculate a panning motion from a user input based on a center point movement of the input shape from at least the first bio-point and the second bio-point (Block 510).

Figure 6:
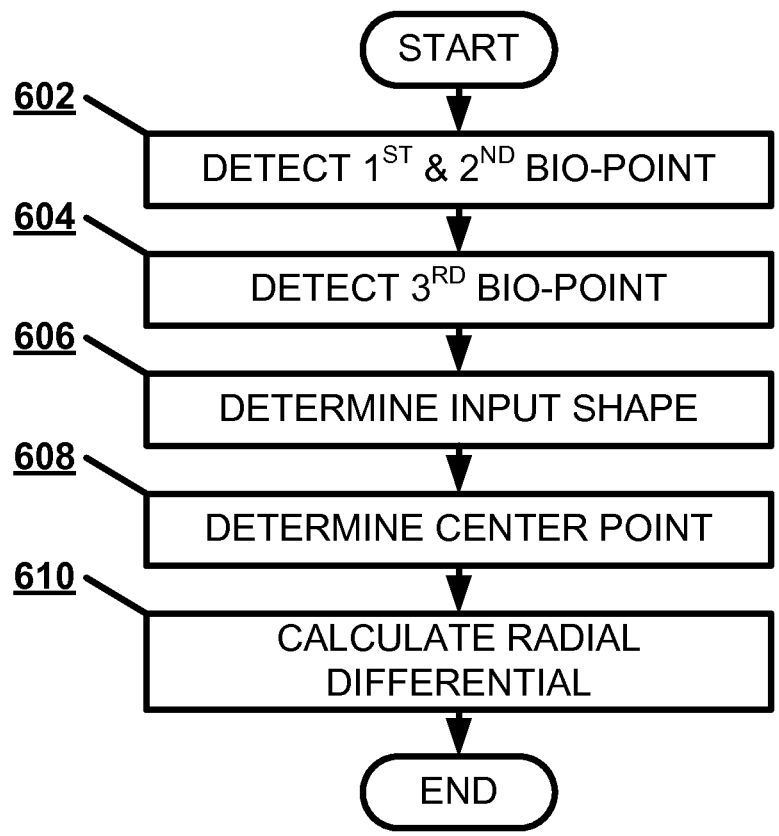
FIG. 6 illustrates, in a flowchart, one embodiment of a method of determining a radial differential.

FIG. 6 illustrates, in a flowchart, one embodiment of a method 600 of determining a radial differential. The graphical display device may detect a first bio-point 210 and a second bio-point 210 in the user input (Block 602). The graphical display device may detect a third bio-point 210 in the user input (Block 604). The graphical display device may determine an input shape 220 based on at least the first bio-point 210 and the second bio-point 210 (Block 606). The graphical display device may determine a center point 230 of the input shape 220 (Block 608). The graphical display device may calculate a radial differential 260 for an input shape 220 (Block 610).

Figure 7:
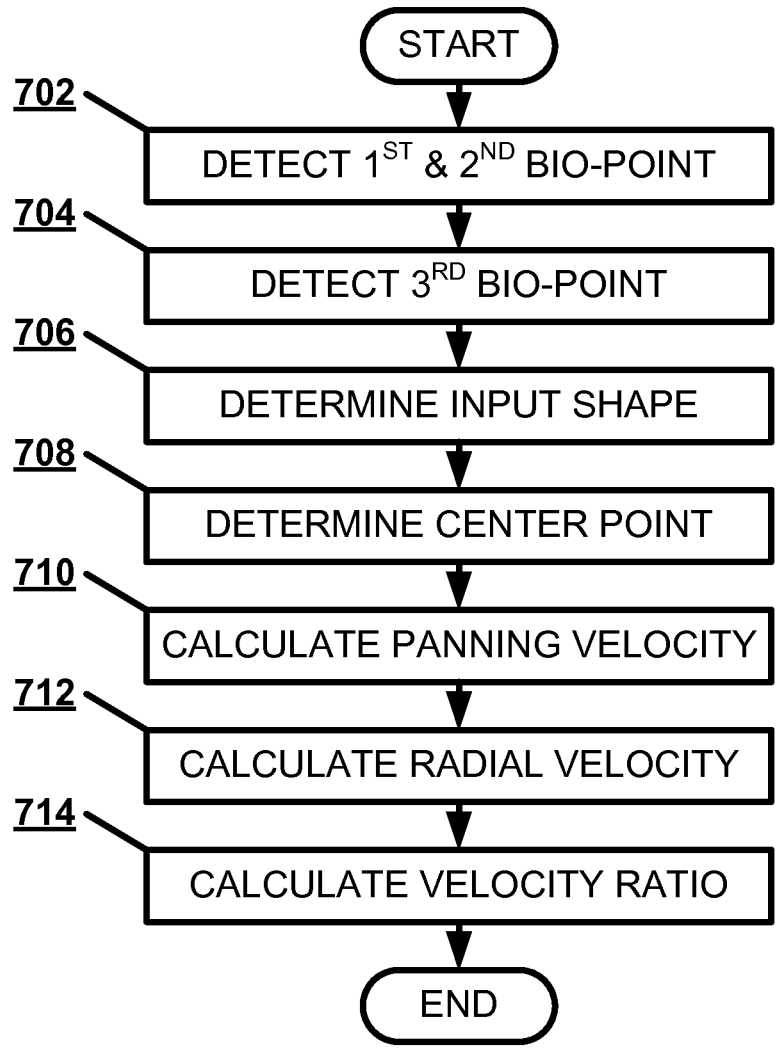
FIG. 7 illustrates, in a flowchart, one embodiment of a method of calculating a velocity ratio.

FIG. 7 illustrates, in a flowchart, one embodiment of a method 700 of calculating a velocity ratio. The graphical display device may detect a first bio-point 210 and a second bio-point 210 in the user input (Block 702). The graphical display device may detect a third bio-point 210 in the user input (Block 704). The graphical display device may determine an input shape 220 based on at least the first bio-point 210 and the second bio-point 210 (Block 706). The graphical display device may determine a center point 230 of the input shape 220 (Block 708). The graphical display device may calculate a panning velocity based on a center point velocity (Block 710). The graphical display device may calculate a radial velocity for an input shape 220 (Block 712). The graphical display device may calculate velocity ratio based on a center point velocity and a radial velocity (Block 714).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
receiving a user input in a user movement interface having at least a first bio-point and a second bio-point;
detecting a panning motion indicating a linear motion of a visual frame from the user input, wherein a linear velocity indicates a linear speed of the linear motion;
detecting a changing distance between the first bio-point and the second bio-point representing a scaling motion indicating at least one of an expansion and a contraction of the visual frame, wherein a radial velocity indicates a radial speed of the scaling motion;
calculating a radial differential between a first value for the changing distance between the first bio-point and the second bio-point at a first time and a second value for the changing distance between the first bio-point and the second bio-point at a second time;
comparing the radial differential to a differential threshold;
determining a velocity ratio of the radial velocity to the linear velocity;
comparing the velocity ratio to a ratio threshold;
removing the scaling motion from the user input and presenting a pan of a graphical user interface to a user based on the panning motion and the removing of the scaling motion when either the radial differential is below the differential threshold or the velocity ratio is below the ratio threshold; and
presenting a pan and scale of the graphical user interface to the user when the radial differential is above the differential threshold and the velocity ratio is above the ratio threshold.

2. The method of claim 1, further comprising:
wherein receiving the user input includes receiving at least a third bio-point;
wherein detecting the changing distance further comprises determining an input shape based on at least the first bio-point, the second bio-point, and the third bio-point in the user input, the input shape having an input radius that represents the scaling motion such that the radial velocity indicates a speed of change of the input radius;
determining a center point of the input shape; and
calculating the linear velocity based on linear movement of the center point of the input shape.

3. The method of claim 1, further comprising:
determining an input shape based on at least the first bio-point and the second bio-point;
determining a center point of the input shape;
calculating the panning motion based on movement of the center point of the input shape.

4. The method of claim 1, further comprising:
calculating the radial differential between the first value for the changing distance between the first bio-point and the second bio-point at the first time and the second value for the changing distance between the first bio-point and the second bio-point at the second time;
comparing the radial differential to the differential threshold; and
wherein removing the scaling motion from the user input is further based on the radial differential being below the differential threshold.

5. The method of claim 1, further comprising:
calculating the radial differential between the first value for the changing distance between the first bio-point and the second bio-point at the first time and the second value for the changing distance between the first bio-point and the second bio-point at the second time;
comparing the radial differential to the differential threshold; and
wherein removing the scaling motion from the user input is further based on the radial differential being above the differential threshold.

6. The method of claim 3, further comprising:
calculating the radial velocity for the input shape.

7. The method of claim 6, further comprising:
calculating the velocity ratio based on a center point velocity and the radial velocity.

8. The method of claim 1, further comprising:
detecting a panning vector from the panning motion; and
railing the panning motion along the panning vector.

9. The method of claim 1, further comprising:
railing the panning motion along a panning vector.

10. The method of claim 1, further comprising:
determining, based on the comparing, that the velocity ratio is above the ratio threshold;
calculating the radial differential between the first value for the changing distance between the first bio-point and the second bio-point at the first time and the second value for the changing distance between the first bio-point and the second bio-point at the second time;
comparing the radial differential to the differential threshold; and
wherein removing the scaling motion from the user input is further based on the radial differential being below the differential threshold.

11. The method of claim 1, further comprising:
maintaining a subsequent scaling motion from the user input at least based on a subsequent velocity ratio being above the ratio threshold; and
removing a subsequent scaling motion from the user input at least based on the subsequent velocity ratio being below the ratio threshold.

12. A tangible machine-readable medium having a set of instructions detailing a method stored thereon that when executed by one or more processors cause the one or more processors to perform the method, the method comprising:
receiving a user input in a user movement interface having at least a first bio-point and a second bio-point;
calculating a panning motion indicating a linear motion of a visual frame from the user input based on a center point movement of an input shape from at least the first bio-point and the second bio-point, wherein a linear velocity indicates a linear speed of the linear motion;
detecting a changing distance between the first bio-point and the second bio-point representing a scaling motion indicating at least one of an expansion and a contraction of the visual frame, wherein a radial velocity indicates a radial speed of the scaling motion;
calculating a radial differential between a first value for the changing distance between the first bio-point and the second bio-point at a first time and a second value for the changing distance between the first bio-point and the second bio-point at a second time;
comparing the radial differential to a differential threshold;
determining a velocity ratio of the radial velocity to the linear velocity;
comparing the velocity ratio to a ratio threshold;
removing the scaling motion from the user input and presenting a pan of a graphical user interface to a user based on the panning motion and the removing of the scaling motion when either the radial differential is below the differential threshold or the velocity ratio is below the ratio threshold; and
presenting a pan and scale of the graphical user interface to the user when the radial differential is above the differential threshold and the velocity ratio is above the ratio threshold.

13. The tangible machine-readable medium of claim 12, wherein the method further comprises:
calculating the radial differential between the first value for the changing distance between the first bio-point and the second bio-point at the first time and the second value for the changing distance between the first bio-point and the second bio-point at the second time;
comparing the radial differential to the differential threshold; and
wherein removing the scaling motion from the user input is further based on the radial differential being below the differential threshold.

14. The tangible machine-readable medium of claim 13, wherein the method further comprises:
maintaining a differential history for optimizing the differential threshold.

15. The tangible machine-readable medium of claim 12, wherein the method further comprises:
maintaining a ratio history for optimizing the ratio threshold.

16. A graphical display device, comprising:
an input device configured to receive a user input having at least a first bio-point and a second bio-point;
a processor configured to
detect a panning motion indicating a linear motion of a visual frame from the user input,
determine an input shape based on the first bio-point and the second bio-point, determine a center point of the input shape,
detecting a changing distance between the first bio-point and the second bio-point representing a scaling motion indicating at least one of an expansion and a contraction of the visual frame, wherein a radial velocity indicates a radial speed of the scaling motion;
calculate a radial differential between a first value for the changing distance between the first bio-point and the second bio-point at a first time and a second value for the changing distance between the first bio-point and the second bio-point at a second time;
compare the radial differential to a differential threshold;
calculate a velocity ratio based on a center point velocity of the center point and the radial velocity of the input shape,
compare the velocity ratio with a ratio threshold, and
remove a scaling motion indicating at least one of an expansion and a contraction of the visual frame from the user input and presenting a pan of a graphical user interface to a user based on the panning motion and the removing of the scaling motion when either the radial differential is below the differential threshold or the velocity ratio is below the ratio threshold; and
a display configured to present a pan and scale of the graphical user interface to the user when the radial differential is above the differential threshold and the velocity ratio is above the ratio threshold.

17. The graphical display device of claim 16, wherein the input device is at least one of a touch screen, a track pad, and a gesture recognition interface.

18. The graphical display device of claim 16, wherein the processor is further configured to:
calculate the radial differential between the first value for the changing distance between the first bio-point and the second bio-point at the first time and the second value for the changing distance between the first bio-point and the second bio-point at the second time;
compare the radial differential to the differential threshold; and
remove the scaling motion from the user input further based on the radial differential being below the differential threshold.

19. The graphical display device of claim 16, wherein the processor is further configured to:
calculate the radial differential between the first value for the changing distance between the first bio-point and the second bio-point at the first time and the second value for the changing distance between the first bio-point and the second bio-point at the second time;

compare the radial differential to the differential threshold; and remove the scaling motion from the user input further based on the radial differential being above the differential threshold.

\* \* \* \* \*